United States Patent [19]

Huang et al.

(10) Patent No.: US 7,345,971 B2
(45) Date of Patent: Mar. 18, 2008

(54) METHOD FOR DETECTING STABLE ROTATION SPEED OF A SPINDLE MOTOR, AND OPTICAL DISC DRIVE THAT PERFORMS THE METHOD

(75) Inventors: Chao-Ming Huang, Hsin-Chu (TW); Yao-Jen Liang, Chang-Hua Hsien (TW)

(73) Assignee: Mediatek Inc., Hsin-Chu (TW)

( * ) Notice: Subject to any disclaimer, the term of this patent is extended or adjusted under 35 U.S.C. 154(b) by 589 days.

(21) Appl. No.: 10/986,916

(22) Filed: Nov. 15, 2004

(65) Prior Publication Data

US 2005/0111321 A1    May 26, 2005

(30) Foreign Application Priority Data

Nov. 26, 2003    (TW) ............................... 92133216 A

(51) Int. Cl.
*G11B 7/00* (2006.01)

(52) U.S. Cl. .................................. 369/47.38

(58) Field of Classification Search ............ 369/53.45, 369/53.43, 53.42, 53.38, 53.37, 53.34, 53.3, 369/47.38, 47.1

See application file for complete search history.

(56) References Cited

U.S. PATENT DOCUMENTS 6,459,220 B1 * 10/2002 Mochizuki et al. ......... 318/254

* cited by examiner

*Primary Examiner*—Nabil Hindi
(74) *Attorney, Agent, or Firm*—Thomas, Kayden, Horstemeyer & Risley

(57) ABSTRACT

An optical disc drive includes a spindle motor, a control unit, and a detection device. The spindle motor is adapted for rotating an optical disc. The control unit controls rotation of the spindle motor. The detection device is coupled to and is controlled by the control unit to detect the rotation speed change rate of the spindle motor within a predetermined time period, to determine if the change rate detected thereby is smaller than a predetermined reference value, and to generate an output signal received by the control unit to indicate that the spindle motor has reached a state where the rotation speed thereof is stable when the change rate detected by the detection device is smaller than the predetermined reference value.

22 Claims, 7 Drawing Sheets

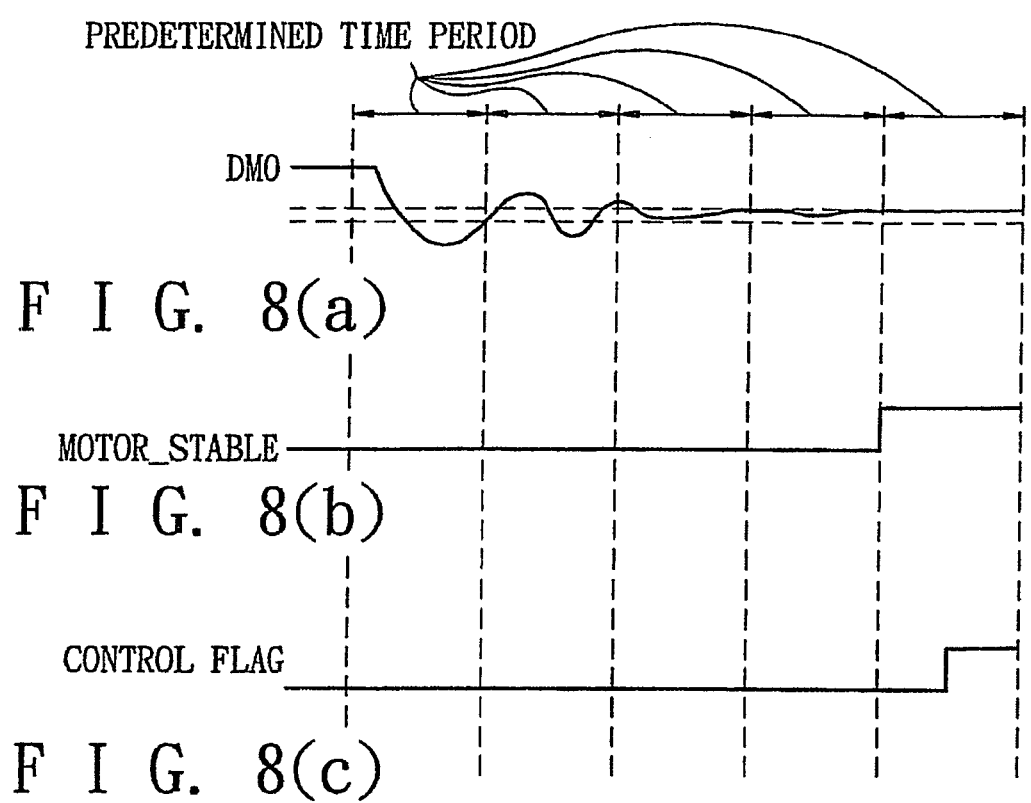

METHOD FOR DETECTING STABLE ROTATION SPEED OF A SPINDLE MOTOR, AND OPTICAL DISC DRIVE THAT PERFORMS THE METHOD

CROSS-REFERENCE TO RELATED APPLICATION

This application claims priority of Taiwanese application no. 092133216, filed on Nov. 26, 2003.

BACKGROUND OF THE INVENTION

1. Field of the Invention

The invention relates to an optical disc drive, more particularly to a method for detecting stable rotation speed of a spindle motor in an optical disk drive, and to an optical disc drive including a detection device for detecting stable rotation speed of a spindle motor in the optical disc drive.

2. Description of the Related Art

For reproduction and recording operations of an optical disc in an optical disc drive, stability of the rotation speed of the optical disc will affect whether the reproduction or recording operation can be processed smoothly by the optical disc drive. In other words, stability of the rotation speed of the spindle motor is essential to ensure good reproduction and writing results.

Referring to FIG. 1, a conventional optical disc drive is shown to have an optical disc 10 placed thereon, and includes a control unit 11 for controlling overall operations of the optical disc drive, a spindle motor (or disc motor) 12 for driving rotation of the optical disc 10, a motor driver 13 coupled to the control unit 11 and the spindle motor 12 for receiving control signals from the control unit 11 and for controlling operation of the spindle motor 12 in response to the control signals received thereby, and an optical pickup 14 coupled to the control unit 11 for reproducing data from or for writing data into the optical disc 10.

When driving the spindle motor 12 to rotate the optical disc 10, the control unit 11 generates a disc motor control output (DMO) that is received by the motor driver 13, which subsequently drives rotation of the spindle motor 12. As the spindle motor 12 rotates the optical disc 10, the control unit 11 can control the optical pickup 14 for reproducing data from or for writing data into the optical disc 10. Moreover, the spindle motor 12 includes a motor frequency pulse generator 121 for detecting rotation speed of the spindle motor 12 and for providing a frequency pulse generator signal (FG), which corresponds to the detected rotation speed, to the control unit 11, such that the control unit 11 can keep track of the rotation status of the spindle motor 12 and adjust the disc motor control output (DMO) accordingly.

There are many factors that can affect rotation speed of the spindle motor 12. For example, initial activation of the spindle motor 12, acceleration/deceleration during a burning process of the optical disc 10, writing after a track jump operation, etc., result in a transition period where the rotation speed of the spindle motor 12 is unstable. As shown in FIG. 2, when the disc motor control output (DMO) changes from an initial value ($V_1$) to an adjusted value ($V_2$), a transition period ($T_0$) is required before the disc motor control output (DMO) stabilizes at the adjusted value ($V_2$). If a reproduction or writing operation is performed within the transition period ($T_0$), the quality of data reproduced from or written into the optical disc 10 will be poor. Moreover, in case of data writing, the writing position on the optical disc 10 may deviate and hinder subsequent data reproduction.

Therefore, in the conventional optical disc drive, data reproduction and writing generally proceed under the control of the control unit 11 only after an estimated transition period ($T_0$) has elapsed. However, due to variations in characteristics of optical disc drives produced by different manufacturers, variations in characteristics of different optical discs, and variations in characteristics of an optical disc drive after a period of use, the duration of the requisite transition period ($T_0$) may vary within a relatively large range. Thus, starting the reproduction or writing only after a preset transition period ($T_0$) has elapsed may not be sufficient to ensure the stability of the rotation speed of the spindle motor 12 at the onset of the reproduction or writing operation. As such, the quality of data reproduced from or written into the optical disc 10 cannot be guaranteed.

SUMMARY OF THE INVENTION

Therefore, the main object of the present invention is to provide a method for detecting stable rotation speed of a spindle motor in an optical disc drive to overcome the aforesaid drawbacks.

Another object of the present invention is to provide an optical disc drive that implements the method of this invention.

Yet another object of the present invention is to provide a detection device that enables an optical disc drive to implement the method of this invention.

According to one aspect of the present invention, there is provided a method for detecting stable rotation speed of a spindle motor in an optical disc drive, comprising the steps of:

a) during initial activation of the spindle motor, detecting the rotation speed change rate of the spindle motor within a predetermined time period;

b) determining if the change rate detected in step a) is smaller than a predetermined reference value; and c) generating an output signal to indicate that the spindle motor has reached a state where the rotation speed thereof is stable when the change rate detected in step a) is smaller than the predetermined reference value.

According to another aspect of the present invention, there is provided an optical disc drive that comprises a spindle motor, a control unit, and a detection device. The spindle motor is adapted for rotating an optical disc. The control unit controls rotation of the spindle motor. The detection device is coupled to and is controlled by the control unit to detect the rotation speed change rate of the spindle motor within a predetermined time period, to determine if the change rate detected thereby is smaller than a predetermined reference value, and to generate an output signal received by the control unit to indicate that the spindle motor has reached a state where the rotation speed thereof is stable when the change rate detected by the detection device is smaller than the predetermined reference value.

According to yet another aspect of the present invention, there is provided a detection device for an optical disc drive that includes a spindle motor adapted for rotating an optical disc, and a control unit for controlling rotation of the spindle motor. The detection device includes an inspecting module, a timing module, and a computing module. The inspecting module determines a maximum value and a minimum value of a target signal that contains rotation speed information of the spindle motor. The timing module is coupled to the inspecting module for enabling operations of the inspecting module during a predetermined time period and for disabling operations of the inspecting module at the end of the predetermined time period. The computing module is coupled to the inspecting module and the timing module for calculating the rotation speed change rate of the spindle motor according to the maximum value and the minimum value of the target signal determined by the inspecting module at the end of the predetermined time period, for comparing the change rate calculated thereby with a predetermined reference value, and for generating an output signal to be provided to the control unit to indicate that the spindle motor has reached a state where the rotation speed thereof is stable when the change rate calculated by the computing module is smaller than the predetermined reference value.

BRIEF DESCRIPTION OF THE DRAWINGS

Other features and advantages of the present invention will become apparent in the following detailed description of the preferred embodiments with reference to the accompanying drawings, of which:

FIGS. 8(a), 8(b) and 8(c) are time graphs of exemplary waveforms of a disk motor control output (DMO), an output signal (MOTOR_STABLE), and a control flag to illustrate operation of the second preferred embodiment.

DETAILED DESCRIPTION OF THE PREFERRED EMBODIMENTS

Figure 1:
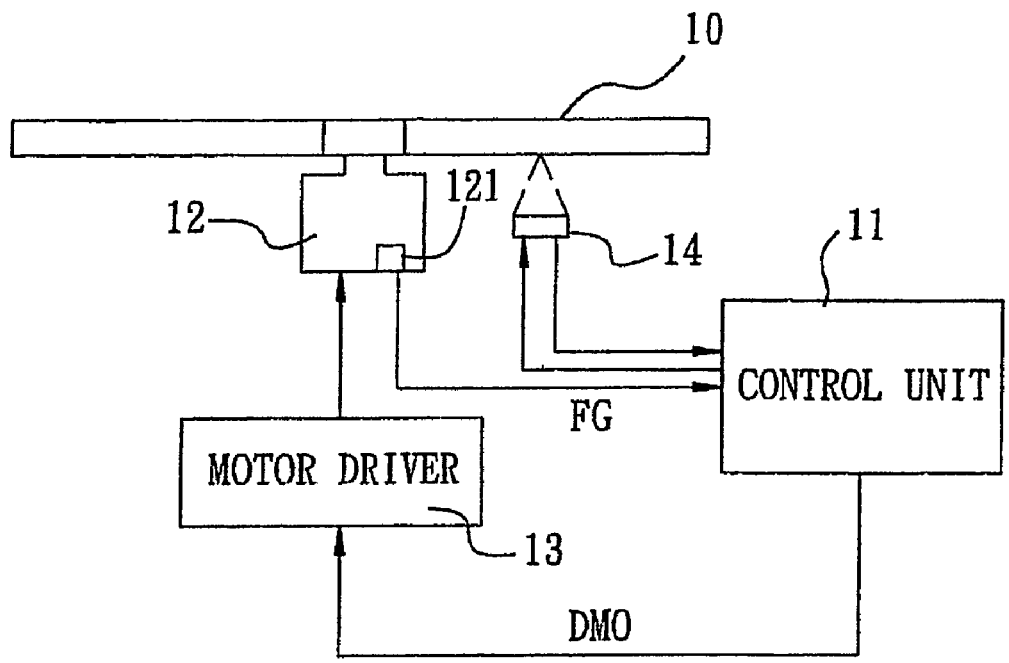
FIG. 1 is a schematic diagram of a conventional optical disc drive.
Figure 2:
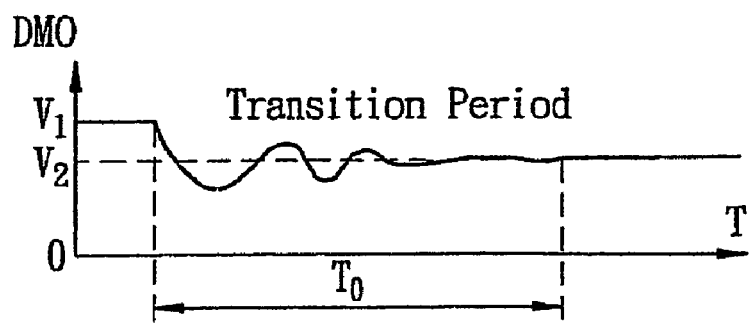
FIG. 2 illustrates how an exemplary disc motor control output (DMO) for motor control varies in the conventional optical disc drive.
Figure 3:
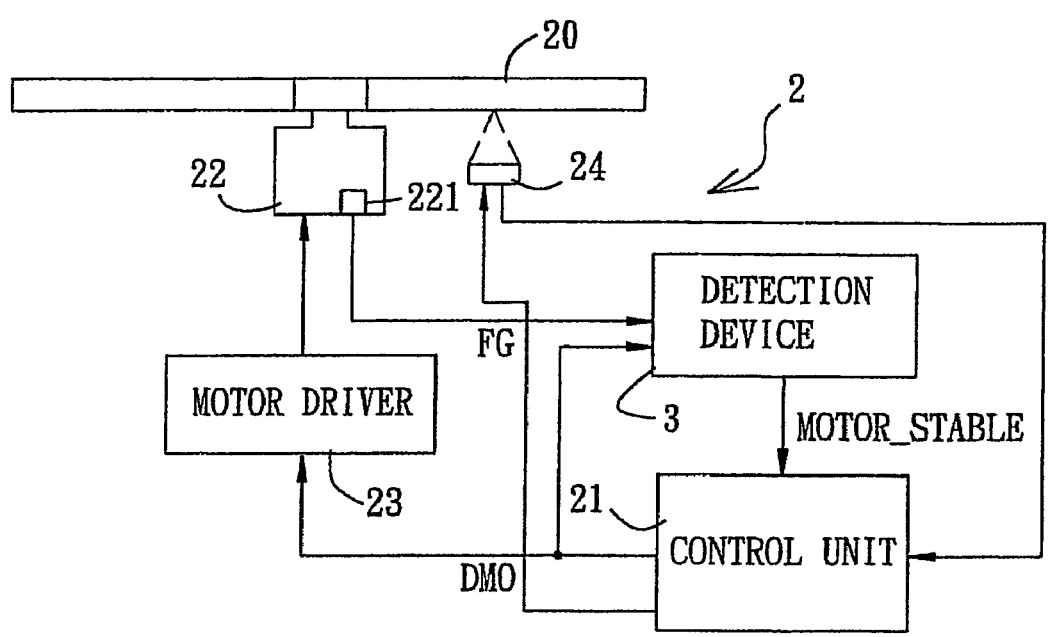
FIG. 3 is a schematic diagram of a first preferred embodiment of an optical disc drive according to the present invention.

Referring to FIG. 3, the first preferred embodiment of an optical disc drive 2 according to the present invention is shown to have an optical disc 20 placed thereon, and includes a control unit 21 for controlling overall operations of the optical disc drive 2, a spindle motor 22 for driving rotation of the optical disc 20, a motor driver 23 coupled to the control unit 21 and the spindle motor 22 for receiving control signals from the control unit 21 and for controlling operation of the spindle motor 22 in response to the control signals received thereby, an optical pickup 24 coupled to the control unit 21 for reproducing data from or for writing data into the optical disc 20, and a detection device 3 for detecting stable rotation speed of the spindle motor 22.

When driving the spindle motor 22 to rotate the optical disc 20, the control unit 21 generates a disc motor control output (DMO) that is received by the motor driver 23, which subsequently drives rotation of the spindle motor 22. As the spindle motor 22 rotates the optical disc 20, the control unit 21 can control the optical pickup 24 for reproducing data from or for writing data into the optical disc 20. Moreover, the spindle motor 22 includes a motor frequency pulse generator 221 for detecting rotation speed of the spindle motor 22 and for providing a frequency pulse generator signal (FG), which corresponds to the detected rotation speed, to the control unit 21 such that the control unit 21 can keep track of the rotation status of the spindle motor 22 and adjust the disc motor control output (DMO) accordingly.

In the present invention, before the control unit 21 initiates an operation that requires activation of the spindle motor 22, such as before the beginning of the burning of the optical disc 20, or before the burning of the optical disc 20 after acceleration or deceleration of the spindle motor 22 or after a track jump operation, etc., the control unit 21 will first activate the detection device 3 for detecting stable rotation speed of the spindle motor 22. The control unit 21 then proceeds with the specified reproduction/write operation only after the stable rotation speed of the spindle motor 22 has been confirmed.

In this invention, the detection device of the optical disc drive processes a target signal, such as the frequency pulse generator signal (FG) or the disc motor control signal (DMO), which contains rotation speed information of the spindle motor 22 when detecting the stable rotation speed of the spindle motor 22.

Figure 4:
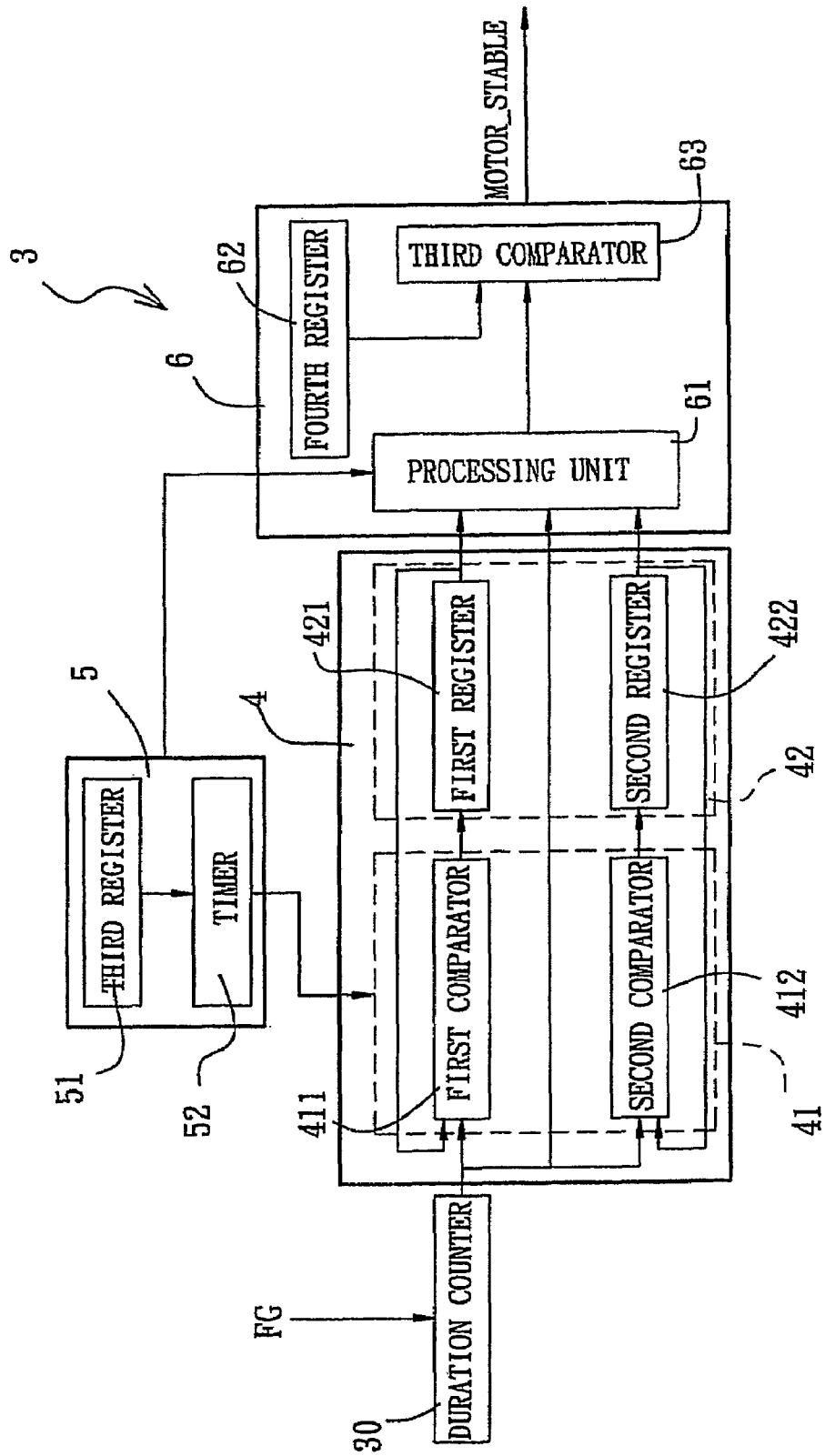
FIG. 4 is a schematic circuit block diagram of a detection device of the first preferred embodiment.
Figure 5:
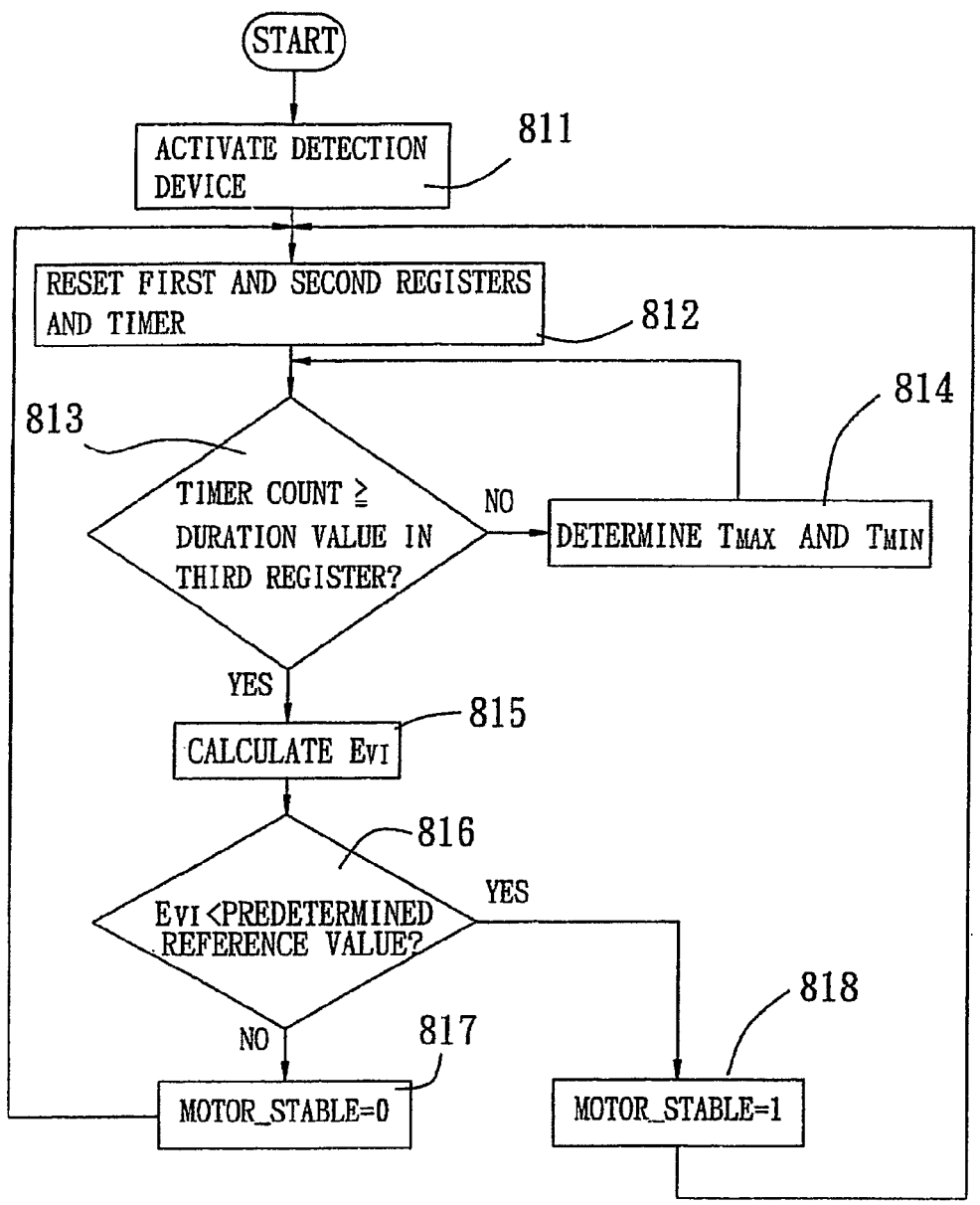
FIG. 5 is a flowchart of the method according to the first preferred embodiment.

In this embodiment, the detection device 3 processes the frequency pulse generator signal (FG) from the motor frequency pulse generator 221 of the spindle motor 22. Referring to FIGS. 4 and 5, the detection device 3 includes a duration counter 30, an inspecting module 4 coupled to the duration counter 30, a timing module 5 coupled to the inspecting module 4, and a computing module 6 coupled to the duration counter 30, the inspecting module 4 and the timing module 5.

Figures 6A, 6B, 6C:
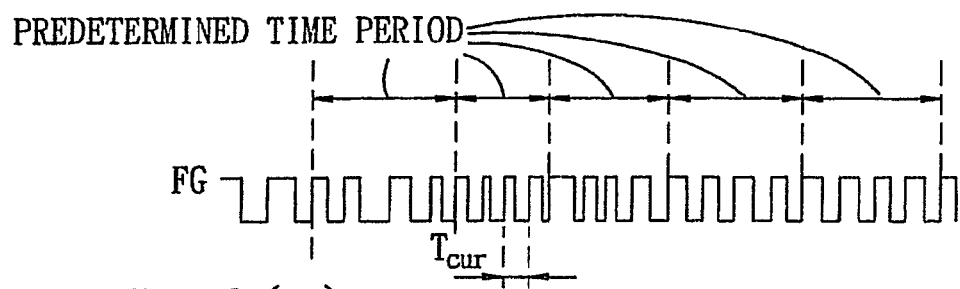
FIGS. 6(a), 6(b) and 6(c) are time graphs of exemplary waveforms of a frequency pulse generator signal (FG), an output signal (MOTOR_STABLE), and a control flag to illustrate operation of the first preferred embodiment.

In general, there are six or eighteen pulses in the frequency pulse generator signal (FG) during a single rotation cycle of the spindle motor 22. With further reference to FIG. 6(a), the duration counter 30 of this embodiment outputs a current duration value ($T_{cur}$) corresponding to a current one of the pulses in the frequency pulse generator signal (FG), and provides the current duration value ($T_{cur}$) to the inspecting module 4 and the computing module 6.

The inspecting module 4 determines a maximum duration value ($T_{max}$) and a minimum duration value ($T_{min}$) of the frequency pulse generator signal (FG) from the current duration values ($T_{cur}$) received by the inspecting module 4 from the duration counter 30 within a predetermined time period. The inspecting module 4 includes a register unit 42 for storing the maximum and minimum duration values ($T_{max}$, $T_{min}$) and a comparator unit 41 coupled to the register unit 42 for comparing the maximum and minimum duration values ($T_{max}$, $T_{mix}$) stored in the register unit 42 with the current duration value ($T_{cur}$) received from the duration counter 30. In this embodiment, the register unit 42 includes first and second registers 421, 422 for storing the maximum and minimum duration values ($T_{max}$, $T_{min}$), respectively. The comparator unit 41 includes first and second comparators 411, 412, each of which is coupled to a corresponding one of the first and second registers 421, 422 for comparing the value ($T_{max}$ or $T_{min}$) stored in the corresponding one of the first and second registers 421, 422 with the current duration value ($T_{cur}$) received from the duration counter 30.

When the duration counter 30 outputs the current duration value ($T_{cur}$) for a first pulse of the frequency pulse generator signal (FG) for subsequent receipt by the first and second comparators 411, 412, since the first and second registers 421, 422 initially do not have current maximum and minimum duration values ($T_{max}$, $T_{min}$) stored therein, the first and second comparators 411, 412 take the current duration value ($T_{cur}$) as the maximum and minimum duration values ($T_{max}$, $T_{min}$), and permit storage of the current duration value ($T_{cur}$) in the first and second registers 421, 422 accordingly. Subsequently, the first and second comparators 411, 412 will compare another current duration value ($T_{cur}$) with the maximum and minimum duration values ($T_{max}$, $T_{min}$) stored in the first and second registers 421, 422. After comparison, if the current duration value ($T_{cur}$) is larger than the maximum duration value ($T_{max}$) in the first register 421, the first comparator 411 will permit storage of the current duration value ($T_{cur}$) in the first register 421 to replace the previous maximum duration value ($T_{max}$). On the other hand, if the current duration value ($T_{cur}$) is smaller than the minimum duration value ($T_{min}$) stored in the second register 422, the second comparator 412 will permit storage of the current duration value ($T_{cur}$) in the second register 422 to replace the previous minimum duration value ($T_{min}$). In this manner, the maximum and minimum duration values ($T_{max}$, $T_{min}$) are stored in the first and second registers 421, 422 of the register unit 42 at the end of the predetermined time period. In this embodiment, the comparator unit 41 is coupled to the timing module 5 such that operation of the inspecting module 4 for detecting the maximum and minimum duration values ($T_{max}$, $T_{min}$) is enabled during the predetermined time period and such that detecting operation of the inspecting module 4 is disabled at the end of the predetermined time period.

In this embodiment, the timing module 5 includes a third register 51 for storing a duration value corresponding to the predetermined time period, and a timer 52 coupled to the third register 51 for controlling operations of the inspecting module 4 and the computing module 6 with reference to the duration value stored in the third register 51. Timing activity of the timer 52 begins when the control unit 21 activates the detection device 3. In particular, when a timer count of the timer 52 reaches the duration value in the third register 51, the timer 52 generates a disable signal to the inspecting module 4 for disabling operation of the inspecting module 4, and at the same time generates an enable signal to the computing module 6 for activating the computing module 6. In this embodiment, the duration value stored in the third register 51 is chosen according to design requirements, for instance, twenty rotation cycles of the spindle motor 22.

The computing module 6 calculates the rotation speed change rate ($E_{v1}$) of the spindle motor 22 according to the maximum and minimum duration values ($T_{max}$, $T_{min}$) of the frequency pulse generator signal determined by the inspecting module 4 at the end of the predetermined time period, compares the change rate ($E_{v1}$) calculated thereby with a predetermined reference value, and generates an output signal (MOTOR_STABLE) to be provided to the control unit 21 to indicate that the spindle motor 22 has reached a state where the rotation speed thereof is stable when the change rate ($E_{v1}$) calculated by the computing module 6 is smaller than the predetermined reference value. In this embodiment, the computing module 6 includes a processing unit 61, a fourth register 62, and a third comparator 63.

The processing unit 61 is coupled to the duration counter 30, the first and second registers 421, 422 of the inspecting module 4, and the timing module 5. The processing unit 61 receives the current duration value ($T_{cur}$) from the duration counter 30 and the maximum and minimum duration values ($T_{max}$, $T_{min}$) from the first and second registers 421, 422, and is enabled by the timing module 5 to calculate the change rate ($E_{v1}$) of the rotation speed of the spindle motor 22 according to the following equation:

$$E_{v1} = (T_{max} - T_{min})/(T_{cur}) \qquad \text{Equation 1}$$

Upon calculating the rotation speed change rate ($E_{v1}$) of the spindle motor 22, the processing unit 61 outputs the calculated change rate ($E_{v1}$) for subsequent processing.

The fourth register 62 stores the predetermined reference value that was chosen according to design requirements, for instance, 0.08%.

The third comparator 63 is coupled to the processing unit 61 and the fourth register 62 for comparing the change rate ($E_{v1}$) calculated by the processing unit 61 with the predetermined reference value stored in the fourth register 62, and for generating the output signal (MOTOR_STABLE) that indicates stable motor rotation speed according to the comparison result performed thereby. In this embodiment, when the change rate ($E_{v1}$) is smaller than the predetermined reference value, the output signal (MOTOR_STABLE) is set as '1' (i.e., a first logic state). On the other hand, when the change rate ($E_{v1}$) is not smaller than the predetermined reference value, the output signal (MOTOR_STABLE) is set as '0' (i.e., a second logic state).

In this manner, with additional reference to FIG. 6(b), before the optical disc drive 2 proceeds with an operation that requires the rotation speed of the spindle motor 22 to be stable, such as a reproduction or write operation, the control unit 21 first inspects the logic state of the output signal (MOTOR_STABLE). The operation is permitted to start, such by setting a control flag (see FIG. 6(c)) to initiate start of the writing of data into the optical disc 20, only if the output signal (MOTOR_STABLE) is set to the first logic state. Upon detecting that the output signal (MOTOR_STABLE) is set to the second logic state, the detection device 3 can be reset by the control unit 21 to repeat the aforesaid detection process until the output signal (MOTOR_STABLE) is set to the first logic state.

The method performed by the optical disc drive 2 of the first preferred embodiment will now be described with reference to FIG. 5. In the flowchart of FIG. 5, it is assumed that the optical disc drive 2 intends to start an operation that requires the rotation speed of the spindle motor 22 to be stable, such as a data reproduction or data writing operation.

In step 811, during initial activation of the spindle motor 22, the control unit 21 also activates the detection device 3. Thereafter, in step 812, the first register 421, the second register 422, and the timer 52 are all reset. In step 813, it is determined if the timer count has reached the duration value stored in the third register 51. If not, the flow proceeds to step 814, where the inspecting module 4 determines the maximum and minimum duration values ($T_{max}$, $T_{min}$) from the output ($T_{cur}$) of the duration counter 30 in the manner described hereinabove, and back to step 813. Otherwise, the flow proceeds to step 815.

In step B15, the processing unit 61 of the computing module 6 is enabled by the timing module 5 to calculate the rotation speed change rate ($E_{v1}$) of the spindle motor 22. Then, in step 816, the third comparator 63 compares the change rate ($E_{v1}$) calculated by the processing unit 61 with the predetermined reference value stored in the fourth register 62. If the calculated change rate ($E_{v1}$) is not smaller than the predetermined reference value, the flow goes to step 817, where the output signal (MOTOR_STABLE) is set to '0'. Otherwise, the flow goes to step 818, where the output signal (MOTOR_STABLE) is set to '1'.

Accordingly, the control unit 21 is able to determine whether the rotation speed of the spindle motor 22 has stabilized by simply inspecting the logic state of the output signal (MOTOR_STABLE). Hence, operations that require stable rotation speed of the spindle motor 22, such as data reproduction and data writing operations, can be accurately controlled by the control unit 21 to begin only after it has been confirmed that the rotation speed of the spindle motor 22 has stabilized. The quality of data reproduced from or written into the optical disc 20 is thus ensured. Moreover, after step 817 or 818, the flow goes back to step 812 for continuous monitoring of the stability of the rotation speed of the spindle motor 22.

Figure 7:
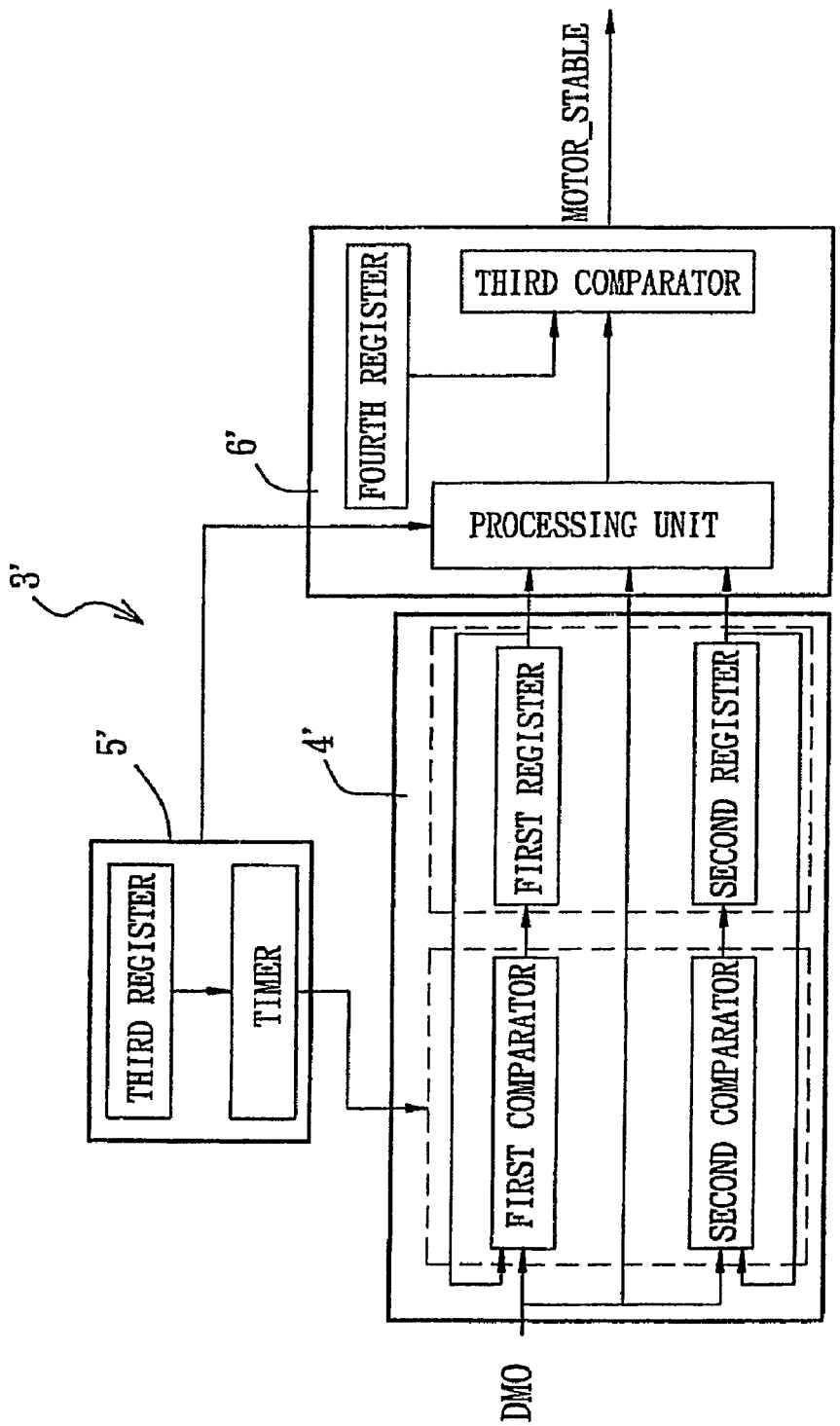
FIG. 7 is a schematic circuit block diagram of a detection device of a second preferred embodiment of an optical disk drive according to this invention.

FIGS. 7 and 8(*a*) to 8(*c*) illustrate a detection device 3' of the second preferred embodiment of an optical disc drive according to this invention. In this embodiment, the detection device 3' determines the change in value of the disc motor control output (DMO) (see FIG. 8(*a*)) from the control unit 21 (see FIG. 3) of the optical disc drive within a predetermined time period to detect stable rotation speed of the spindle motor 22. As shown in FIG. 7, unlike the previous embodiment, a duration counter is not required in the detection device 3'. The inspecting module 4' of the detection device 3' detects a maximum value ($D_{max}$) and a minimum value ($D_{min}$) of the disk motor control output (DMO) within the predetermined time period (for example, 200 msec). At the end of the predetermined time period, the timing module 5' enables the computing module 6' to calculate the rotation speed change rate ($E_{v2}$) of the spindle motor 22 according to the maximum value ($D_{max}$) and the minimum value ($D_{min}$) from the inspecting module 4', and the current value ($D_{cur}$) of the disc motor control output (DMO) according to the following equation:

$$E_{v2}(D_{max}-D_{min})/(D_{cur}) \qquad \text{Equation 2}$$

The computing module 6' then compares the calculated change rate ($E_{v2}$) with the predetermined reference value (such as 10%), and generates the output signal (MOTOR_STABLE) that indicates stable motor rotation speed according to the comparison result performed thereby. Like the previous embodiment, when the change rate ($E_{v2}$) is smaller than the predetermined reference value, the output signal (MOTOR_STABLE) is set as '1' (i.e., the first logic state). On the other hand, when the change rate ($E_{v2}$) is not smaller than the predetermined reference value, the output signal (MOTOR_STABLE) is set as '0' (i.e., the second logic state).

Likewise, before an optical disc drive that incorporates the detection device 3' proceeds with an operation that requires the rotation speed of the spindle motor 22 to be stable, such as a reproduction or write operation, the control unit 21 first inspects the logic state of the output signal (MOTOR_STABLE). The operation is permitted to start (see FIG. 8(*c*)) only if the output signal (MOTOR_STABLE) is set to the first logic state. Upon detecting that the output signal (MOTOR_STABLE) is set to the second logic state, the detection device 3' can be reset by the control unit 21 to repeat the aforesaid detection process until the output signal (MOTOR_STABLE) is set to the first logic state.

In sum, because operations that require stable rotation speed of the spindle motor 22, such as data reproduction and data writing operations, can be accurately controlled by the control unit 21 to begin only after it has been confirmed that the rotation speed of the spindle motor 22 has stabilized, the quality of data reproduced from or written into the optical disc 20 is accordingly ensured.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements

We claim:

1. A method for detecting stable rotation speed of a spindle motor in an optical disc drive, comprising the steps of:
    a) during initial activation of the spindle motor, detecting a rotation speed change rate of the spindle motor within a predetermined time period;
    b) determining if the change rate detected in step a) is smaller than a predetermined reference value; and
    c) generating an output signal to indicate that the spindle motor has reached a state where the rotation speed thereof is stable when the change rate detected in step a) is smaller than the predetermined reference value.

2. The method as claimed in claim 1, wherein the output signal generated in step c) is used to enable further reproduction/write operations of the optical disc drive.

3. The method as claimed in claim 1, wherein, in step a), the rotation speed change rate of the spindle motor is determined from a frequency pulse generator signal outputted by a motor frequency pulse generator in accordance with the rotation speed of the spindle motor.

4. The method as claimed in claim 3, wherein step a) includes:
    i) detecting a maximum duration value (T.sub.max) and a minimum duration value (T.sub.min) of the frequency pulse generator signal within the predetermined time period; and
    ii) calculating the rotation speed change rate (E.sub.v1) of the spindle motor according to the maximum duration value (T.sub.max) and the minimum duration value (T.sub.min).

5. The method as claimed in claim 1, wherein, in step a), the rotation speed change rate of the spindle motor is determined from a disk motor control output generated by a controller for controlling rotation of the spindle motor.

6. The method as claimed in claim 5, wherein step a) includes:
    i) detecting a maximum value (D.sub.max) and a minimum value (D.sub.min) of the disk motor control output within the predetermined time period; and
    ii) calculating the rotation speed change rate (E.sub.v2) of the spindle motor according to the maximum value (D.sub.max) and the minimum value (D.sub.min).

7. The method as claimed in claim 1, wherein the output signal generated in step c) has a first logic state when the change rate detected in step a) is determined to be smaller than the predetermined reference value, and has a second logic state being different from the first logic state when the change rate detected in step a) is determined to be not smaller than the predetermined reference value.

8. An optical disc drive comprising:
    a spindle motor adapted for rotating an optical disc;
    a control unit for controlling rotation of said spindle motor; and
    a detection device coupled to and controlled by said control unit to detect the rotation speed change rate of said spindle motor within a predetermined time period, to determine if the change rate detected thereby is smaller than a predetermined reference value, and to generate an output signal received by said control unit to indicate that said spindle motor has reached a state where the rotation speed thereof is stable when the change rate detected by said detection device is smaller than the predetermined reference value.

9. The optical disk drive as claimed in claim 8, wherein said detection device includes:
an inspecting module for determining a maximum value and a minimum value of a target signal that contains rotation speed information of said spindle motor;
a timing module coupled to said inspecting module for enabling operations of said inspecting module during the predetermined time period and for disabling operations of said inspecting module at the end of the predetermined time period; and
a computing module coupled to said inspecting module and said timing module for calculating the rotation speed change rate of said spindle motor according to the maximum value and the minimum value of the target signal determined by said inspecting module at the end of the predetermined time period, for comparing the change rate calculated thereby with the predetermined reference value, and for generating the output signal in accordance with the comparison result performed by said computing module.

10. The optical disk drive as claimed in claim 9, wherein said inspecting module includes:
a register unit for storing the maximum and minimum values of the target signal; and
a comparator unit coupled to said register unit for comparing the maximum and minimum values stored in said register unit with a current value of the target signal, and for updating one of the maximum and minimum values stored in said register unit according to the comparison result performed by said comparator unit.

11. The optical disk drive as claimed in claim 10, wherein: said register unit includes first and second registers for storing the maximum and minimum values of the target signal, respectively; and said comparator unit includes first and second comparators, each of which is coupled to a corresponding one of said first and second registers for comparing the value stored in the corresponding one of said first and second registers with the current value of the target signal.

12. The optical disk drive as claimed in claim 9, wherein said timing module includes a third register for storing a duration value corresponding to the predetermined time period, and a timer coupled to said third register and controlling operations of said inspecting module and said computing module with reference to the duration value stored in said third register.

13. The optical disk drive as claimed in claim 9, wherein said computing module includes:
a processing unit coupled to said inspecting module for calculating the rotation speed change rate of said spindle motor; a fourth register for storing the predetermined reference value; and
a third comparator coupled to said processing unit and said fourth register for comparing the change rate calculated by said processing unit with the predetermined reference value stored in said fourth register, and for generating the output signal accordingly.

14. The optical disk drive as claimed in claim 13, wherein the output signal generated by said third comparator has a first logic state when the change rate calculated by said processing unit is smaller than the predetermined reference value, and has a second logic state different from the first logic state when the change rate calculated by said processing unit is not smaller than the predetermined reference value.

15. The optical disk drive as claimed in claim 9, further comprising a motor frequency pulse generator for generating the target signal in accordance with the rotation speed of said spindle motor, said detection device further including a duration counter coupled to said motor frequency pulse generator and said inspecting module, said duration counter processing the target signal from said motor frequency pulse generator and providing a current value of the target signal to said inspecting module.

16. The optical disk drive as claimed in claim 9, further comprising a controller coupled to said inspecting module, said controller generating the target signal to control rotation of said spindle motor.

17. A detection device for an optical disc drive that includes a spindle motor adapted for rotating an optical disc, and a control unit for controlling rotation of the spindle motor, said detection device comprising:
an inspecting module for determining a maximum value and a minimum value of a target signal that contains rotation speed information of the spindle motor;
a timing module coupled to said inspecting module for enabling operations of said inspecting module during a predetermined time period and for disabling operations of said inspecting module at the end of the predetermined time period; and
a computing module coupled to said inspecting module and said timing module for calculating a rotation speed change rate of the spindle motor according to the maximum value and the minimum value of the target signal determined by said inspecting module at the end of the predetermined time period, for comparing the change rate calculated thereby with a predetermined reference value, and for generating an output signal to be provided to the control unit to indicate that the spindle motor has reached a state where the rotation speed thereof is stable when the change rate calculated by said computing module is smaller than the predetermined reference value.

18. The detection device as claimed in claim 17, wherein said inspecting module includes:
a register unit for storing the maximum and minimum values of the target signal; and
a comparator unit coupled to said register unit for comparing the maximum and minimum values stored in said register unit with a current value of the target signal, and for updating one of the maximum and minimum values stored in said register unit according to the comparison result performed by said comparator unit.

19. The detection device as claimed in claim 18, wherein: said register unit includes first and second registers for storing the maximum and minimum values of the target signal, respectively; and said comparator unit includes first and second comparators, each of which is coupled to a corresponding one of said first and second registers for comparing the value stored in the corresponding one of said first and second registers with the current value of the target signal.

20. The detection device as claimed in claim 17, wherein said timing module includes a third register for storing a duration value corresponding to the predetermined time period, and a timer coupled to said third register and controlling operations of said inspecting module and said computing module with reference to the duration value stored in said third register.

21. The detection device as claimed in claim 17, wherein said computing module includes:
- a processing unit coupled to said inspecting module for calculating the rotation speed change rate of the spindle motor;
- a fourth register for storing the predetermined reference value; and
- a third comparator coupled to said processing unit and said fourth register for comparing the change rate calculated by said processing unit with the predetermined reference value stored in said fourth register, and for generating the output signal accordingly.

22. The detection device as claimed in claim 21, wherein the output signal generated by said third comparator has a first logic state when the change rate calculated by said processing unit is smaller than the predetermined reference value, and has a second logic state being different from the first logic state when the change rate calculated by said processing unit is not smaller than the predetermined reference value.

* * * * *